(12) United States Patent
Garg et al.

(10) Patent No.: US 8,566,533 B1
(45) Date of Patent: Oct. 22, 2013

(54) SYSTEM, METHOD, AND COMPUTER PROGRAM PRODUCT FOR CONDITIONALLY SENDING A REQUEST FOR DATA TO A NODE BASED ON A DETERMINATION

(75) Inventors: Gaurav Garg, San Jose, CA (US); David T. Hass, Santa Clara, CA (US)

(73) Assignee: NetLogic Microsystems, Inc., Irvine, CA (US)

( * ) Notice: Subject to any disclaimer, the term of this patent is extended or adjusted under 35 U.S.C. 154(b) by 581 days.

(21) Appl. No.: 12/571,233

(22) Filed: Sep. 30, 2009

(51) Int. Cl.
*G06F 12/00* (2006.01)

(52) U.S. Cl.
USPC ........... 711/141; 711/121; 711/130; 711/144; 711/146; 711/147; 711/156

(58) Field of Classification Search
USPC .......... 711/141, 121, 130, 144, 146, 147, 156
See application file for complete search history.

(56) References Cited

U.S. PATENT DOCUMENTS

| | | | |
|---|---|---|---|
| 5,802,578 A * | 9/1998 | Lovett | 711/147 |
| 6,055,605 A | 4/2000 | Sharma et al. | |
| 6,115,804 A | 9/2000 | Carpenter et al. | |
| 6,343,346 B1 | 1/2002 | Olnowich | |
| 6,598,123 B1 | 7/2003 | Anderson et al. | |
| 6,704,845 B2 | 3/2004 | Anderson et al. | |
| 7,035,968 B1 | 4/2006 | Pereira | |
| 7,143,245 B2 | 11/2006 | Tierney et al. | |
| 7,174,419 B1 | 2/2007 | Ichiriu et al. | |
| 7,215,004 B1 | 5/2007 | Nataraj | |
| 7,404,046 B2 * | 7/2008 | Goodman et al. | 711/146 |
| 7,437,520 B2 | 10/2008 | Shen et al. | |
| 7,568,073 B2 | 7/2009 | Shen et al. | |
| 7,589,362 B1 | 9/2009 | Argyres et al. | |
| 7,818,391 B2 | 10/2010 | Van Doren et al. | |
| 7,856,535 B2 | 12/2010 | Shen et al. | |
| 8,099,557 B2 | 1/2012 | McCalpin et al. | |
| 8,347,037 B2 * | 1/2013 | Guthrie et al. | 711/122 |
| 2006/0230237 A1 * | 10/2006 | Sakamoto | 711/141 |
| 2007/0150664 A1 * | 6/2007 | Dombrowski et al. | 711/144 |
| 2007/0287229 A1 | 12/2007 | Nataraj | |
| 2009/0250820 A1 | 10/2009 | Argyres et al. | |

\* cited by examiner

*Primary Examiner* — Stephen Elmore
(74) *Attorney, Agent, or Firm* — Sterne, Kessler, Goldstein & Fox P.L.L.C.

(57) ABSTRACT

In operation, a first request for data is sent to a cache of a first node. Additionally, it is determined whether the first request can be satisfied within the first node, where the determining includes at least one of determining a type of the first request and determining a state of the data in the cache. Furthermore, a second request for the data is conditionally sent to a second node, based on the determination.

21 Claims, 6 Drawing Sheets

SYSTEM, METHOD, AND COMPUTER PROGRAM PRODUCT FOR CONDITIONALLY SENDING A REQUEST FOR DATA TO A NODE BASED ON A DETERMINATION

FIELD OF THE INVENTION

The present invention relates to multiprocessor systems, and more particularly to efficiently querying nodes in such systems for data.

BACKGROUND

Current cache coherence protocols typically fail to recognize and take advantage of the difference in data transfer latency between on-node cache requests and cache requests on other nodes. Many times, this results in coherence protocols incurring the latency of unnecessary node hops while performing a cache request. There is thus a need for addressing these and/or other issues associated with the prior art.

SUMMARY

A system, method, and computer program product are provided for conditionally sending a request for data to a node based on a determination. In operation, a first request for data is sent to a cache of a first node. Additionally, it is determined whether the first request can be satisfied within the first node, where the determining includes at least one of determining a type of the first request and determining a state of the data in the cache. Furthermore, a second request for the data is conditionally sent to a second node, based on the determination.

DETAILED DESCRIPTION

Figure 1:
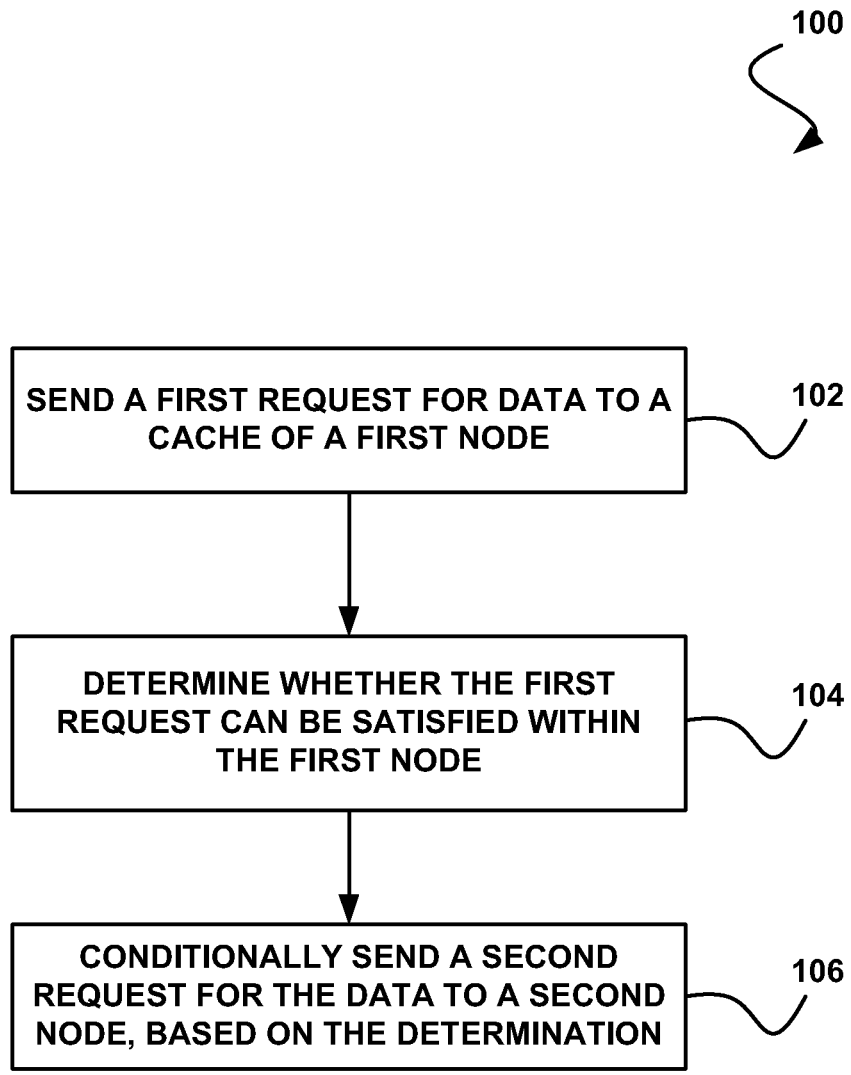
FIG. 1 shows a method for conditionally sending a request for data to a node based on a determination, in accordance with one embodiment.

FIG. 1 shows a method 100 for conditionally sending a request for data to a node based on a determination, in accordance with one embodiment. As shown in operation 102, a first request for data is sent to a cache of a first node.

In the context of the present description, the first node refers to any component of a system capable of containing data in a cache. In various embodiments, the first node may include one or more processors (e.g. central processing units (CPUs), microprocessors, graphics processors, etc.), one or more caches, communication interfaces, hardware accelerators, and/or any other component. In another embodiment, the first node may include multiple processors, each having a separate private cache. For example, the first node may include 2 processors, 4 processors, 8 processors, 16 processors, etc. Additionally, the first node may include a shared public cache.

In still another embodiment, the first node may include a System-on-Chip (SoC) architecture including one or more processor cores and associated caches. For example, the first node may include a chip-multi-processor (CMP). In another embodiment, the first node may be part of a multi-node system.

Additionally, with respect to the present description, the cache may include any type of cache memory. In one embodiment, the cache may include a cache of a particular hierarchy level. For example, the cache may include a level 1 (L1) cache, a level 2 (L2) cache, a level 3 (L3) cache, etc. In another embodiment, the cache may include a cache associated with a processor of the node. For example, the cache may include a private cache of a processor of the first node. In another example, a processor of the first node may send the first request, and the cache may include the private cache of the processor sending the first request.

Additionally, in one embodiment, the first request for data may be sent by any element of the node. For example, the first request for data may be sent by a processor of the first node. In another embodiment, the first request for data may be sent by a coherency controller. In yet another embodiment, the first request may be generated by a private cache of a processor of the first node.

Further still, the first request for data may include any request associated with the data. For example, the first request for data may include a read request. In another example, the first request for data may include a write request. In yet another example, the first request for data may include a snoop request. Additionally, in one embodiment, the first request for data may include a request for a state of the data. In another embodiment, the first request for the data may include a memory location in the cache. For example, the first request for the data may include a request for data at a particular cache-line in the cache.

Further, the data may include any information that can be stored in a cache. In one embodiment, the data may include one or more values written to a particular location in the cache.

Also, as shown in operation 104, it is determined whether the first request can be satisfied within the first node, where the determining includes at least one of determining a type of the first request and determining a state of the data in the cache. In one embodiment, the determining may include determining the type of the first request. For example, it may be determined whether the first request is a read request or a write request.

Additionally, in another embodiment, the determining may include determining the state of the data in the cache. In one embodiment, the state of the data may be included with the data. For example, the state of the data may be included as a tag which exists in the cache at a cache-line. In another embodiment, the state of the data may include one or more bits which are added to the data at a cache-line. In yet another embodiment, the state of the data may be encoded with the data in the cache. In still another embodiment, the state of the data may be included in the cache as a modification of an existing cache state protocol (e.g., an MOESI protocol, an MSI protocol, an MESI protocol, etc.).

Additionally, the state of the data may include an indication of whether the data is locally shared or globally shared. For example, the state of the data may indicate whether another valid copy of the data exists at a node other than the first node. More specifically, the state of the data may indicate that another valid copy of the data exists at a node other than the first node, or that no valid copies of the data exist at a node other than the first node.

Additionally, in another embodiment, determining whether the first request can be satisfied within the first node may include determining whether the cache contains a valid copy of the data. In one example, the cache may include the state of the data in the cache, where the state of the data in the cache may indicate whether the cache contains a valid copy of the data, and the state may be used to determine whether the cache contains a valid copy of the data.

Further, in yet another embodiment, determining whether the first request can be satisfied within the first node may include determining whether the data is locally shared or globally shared. Further still, the determining whether the data is locally shared or globally shared may be performed using the state of the data in the cache. For example, the state of the data may be included in the cache, where the state of the data in the cache may indicate whether another valid copy of the data exists at a node other than the first node.

Further still, in one embodiment, the first request may not be satisfied within the first node if the first request is a write request, the cache contains a valid copy of the data, and another valid copy of the data exists at another node. In another embodiment, the first request may be satisfied within the first node if the first request is a write request, the cache contains a valid copy of the data, and all valid copies of the data exist only within the first node. In yet another embodiment, the first request may be satisfied within the first node if the first request is a read request and the cache contains a valid copy of the data.

Additionally, a second request for the data is conditionally sent to a second node, based on the determination. See operation 106. In one embodiment, the second request for the data may be sent to the second node if it is determined that the first request cannot be satisfied within the first node. In another embodiment, the second request for the data may be sent by a coherency controller of the first node.

Further, in the context of the current embodiment, the second node may include any node other than the first node. In one embodiment, the second node may include a home node of a memory address to which the data is allocated. For example, the data may be associated with (e.g., mapped to, etc.) a memory address. This memory address may fall under a portion of memory addresses allocated to a node which is referred to as the home node for that portion of memory addresses. In one embodiment, the home node may be part of a multi-node system.

It should be noted that the method 100 may be implemented in the context of any multiprocessor system. For example, in one embodiment, the method 100 may be implemented in the context of a cache coherent non-uniform memory architecture (ccNUMA). In another embodiment, the method 100 may be implemented in the context of a point-to-point multiprocessor system. In yet another embodiment, the method 100 may be implemented in the context of a point-to-point link based ccNUMA multiprocessor system, a symmetric multiprocessor (SMP) system, etc.

In this way, unnecessary requests for data from nodes other than the first node may be avoided if the other nodes do not have valid copies of the data. As a result, overall latency from cache data requests and transfers may be minimized.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
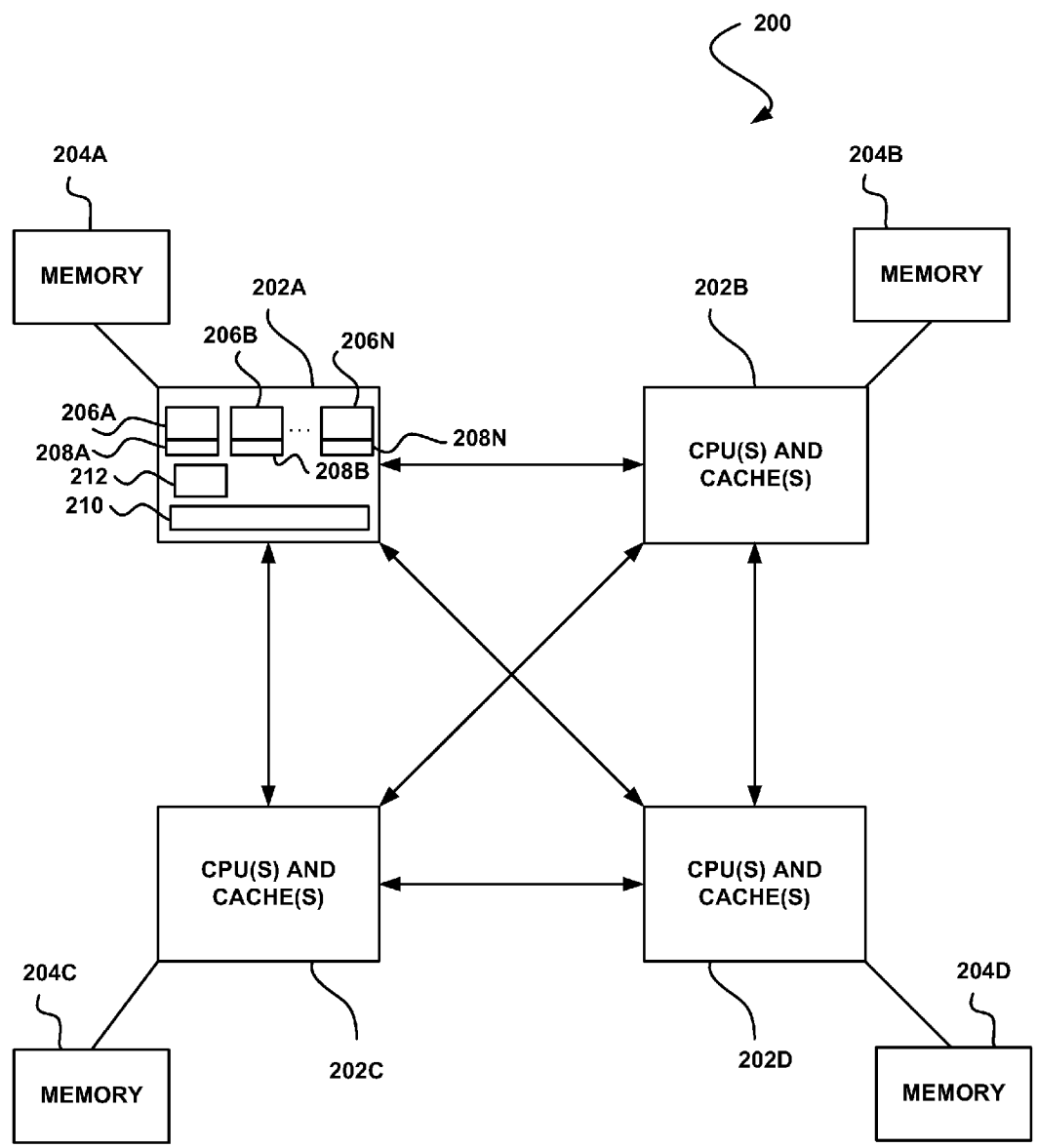
FIG. 2 shows a multiprocessor system for conditionally sending a request for data to a node based on a determination, in accordance with another embodiment.

FIG. 2 shows a multiprocessor system 200 for conditionally sending a request for data to a node based on a determination, in accordance with one embodiment. As an option, the present system 200 may be implemented to carry out the method 100 of FIG. 1. Of course, however, the system 200 may be implemented in any desired environment. It should also be noted that the aforementioned definitions may apply during the present description.

As shown, the system 200 includes a plurality of nodes 202A-D, each including processors and associated caches. For example, node 202A includes processors 206A-N, each containing a private cache 208A-N. In one embodiment, each of private caches 208A-N may include an L2 cache. In another embodiment, each of private caches 208A-N may include an L1 cache. Additionally, node 202A includes a shared cache 210. In one embodiment, shared cache 210 may include an L3 cache. In another embodiment, shared cache 210 may include an L2 cache. Of course, however, any cache hierarchy may be utilized.

Additionally, each of the nodes 202A-D also has an associated memory 204A-D. For example, the total available memory for the system 200 may be divided among all the nodes 202A-D and may be physically attached to the node to which it is allocated. In one embodiment, a total available memory may be divided into associated memory 204A-D, where each associated memory 204A-D is assigned to nodes 202A-D, respectively.

Further, the associated memory 204A-D may include any type of memory, for example, dynamic random access memory (DRAM), etc. Further still, the total address space of software running on the system 200 may be divided amongst the memory 204A-D. In this way, particular addresses may be associated with particular portions of the memory.

In accordance with one exemplary embodiment, a processor of a node in system 200 may send a first request for data to a cache of the node. For example, processor 206A of node 202A may send a first request for data to its respective private cache 208A, or to one of private caches 208B-N of node 202A. In another example, processor 206A of node 202A may send the first request for data to shared cache 210 of node 202A.

In another embodiment, a coherency controller of the node may send the first request. For example, coherency controller 212 of node 202A may send the first request to one of private caches 208A-N of node 202A, or to shared cache 210 of node 202A.

Additionally, the type of the first request may be determined. For example, it may be determined whether the first request for data to the cache in node 202A is a read request or a write request. Further, a state of the data in the cache of the node may be determined. For example, the state of the data may be returned by the cache of node 202A that received the first request for data, where the state indicates whether the data is valid and whether the data is locally shared or globally shared.

Further still, based on the type of the first request and the state of the data in the cache of the node, it may be determined whether the first request for data can be satisfied within node 202A. For example, if a read request is sent to one of private caches 208A-N of node 202A, or to shared cache 210 of node 202A, and the cache that receives the request responds with a state of the data that indicates that the data is valid, then it may be determined that the first request for data can be satisfied within node 202A.

In another example, if a write request is sent to one of private caches 208A-N of node 202A, or to shared cache 210 of node 202A, and the cache that receives the request responds with a state of the data that indicates that the data is valid, and that the data is locally shared, then it may be determined that the first request for data can be satisfied within node 202A. However, if a write request is sent to one of private caches 208A-N of node 202A, or to shared cache 210 of node 202A, and the cache that receives the request responds with a state of the data that indicates that the data is valid, and that the data is globally shared, then it may be determined that the first request for data cannot be satisfied within node 202A.

Also, a second request for the data may be conditionally sent by node 202A to one of nodes 202B-D of the system 200. For example, node 202A may not send a second request for the data to one of nodes 202B-D of the system 200 if it is determined that the first request for data can be satisfied within node 202A. Additionally, node 202A may send a second request for the data to one of nodes 202B-D of the system 200 (for example, the home node of the address associated with the data) if it is determined that the first request for data cannot be satisfied within node 202A.

As a result, if the first request for data can be satisfied within node 202A, additional data requests are not sent to other nodes in the system 200. This may result in an avoidance of unnecessary multiple inter-chip hops since a cache on the requesting processor's node returns the requested data, and may thereby reduce overall latency.

Figure 3:
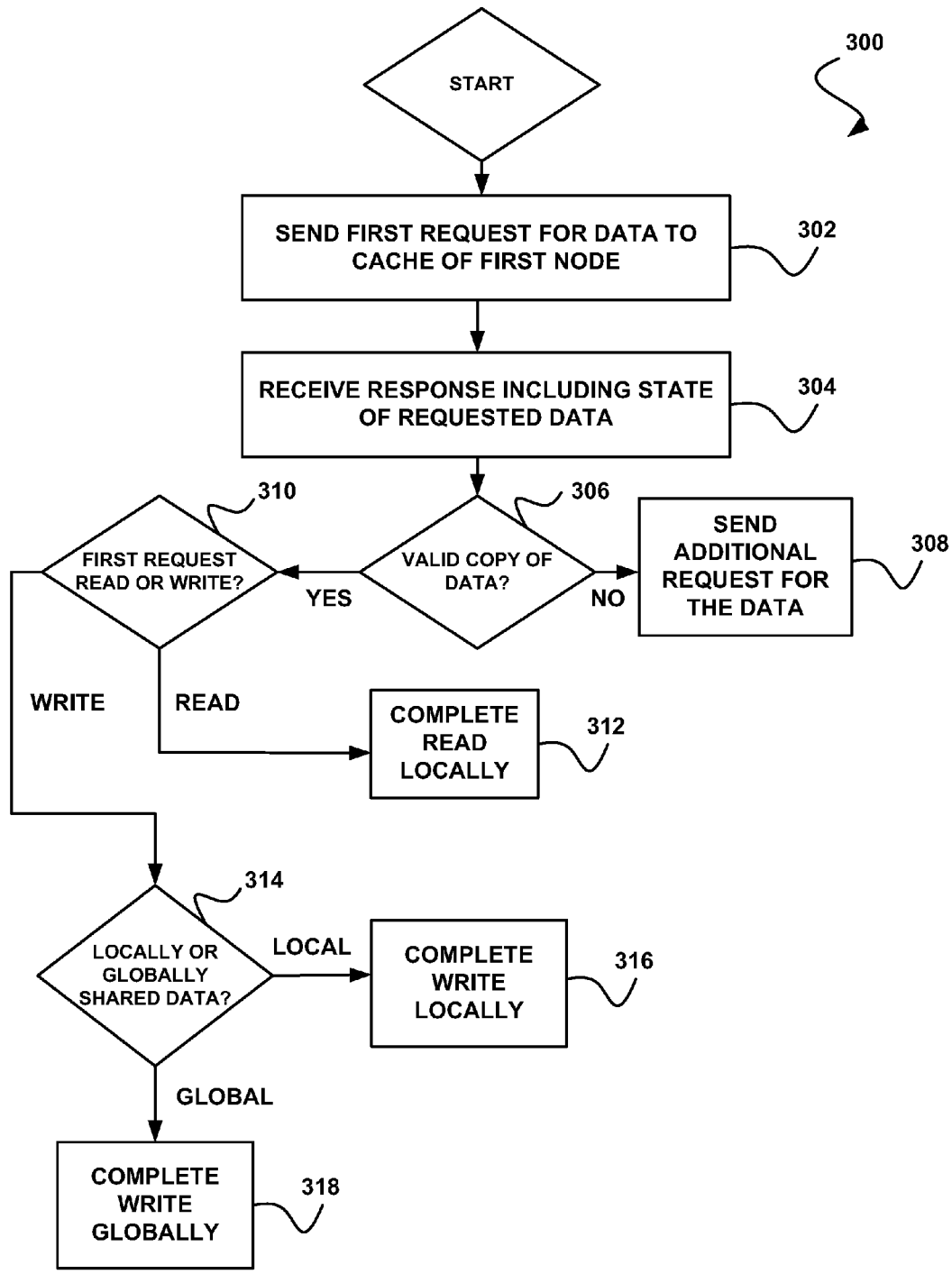
FIG. 3 shows a method for determining whether a request can be satisfied within a node, in accordance with yet another embodiment.

FIG. 3 shows a method 300 for determining whether a request can be satisfied within a node, in accordance with yet another embodiment. As an option, the method 300 may be carried out in the context of the functionality and architecture of FIGS. 1-2. Of course, however, the method 300 may be carried out in any desired environment.

As shown in operation 302, a first request for data is sent to a cache of a first node. For example, one of processors 206A-N of node 202A may send a request for data to one of private caches 208A-N or shared cache 210 of node 202A. In another example, coherency controller 212 of node 202A may send a request for data to one of private caches 208A-N or shared cache 210 of node 202A. Additionally, as shown in operation 304, a response including a state of the requested data is received from the cache. For example, the cache that received the first request in operation 302 may send a response to the first request.

In one embodiment, the response may include one or more bits corresponding to a state of a cache state protocol, where the cache state protocol includes an indication of whether data is globally or locally shared. One exemplary cache state protocol that modifies a MOESI cache protocol is shown in Table 1. Of course, it should be noted that the current embodiment may not be limited to the cache state protocol shown in Table 1, and that any other cache state protocol that includes an indication of whether data is globally or locally shared may be used (e.g., a modified MSI cache protocol, a modified MESI cache protocol, etc.).

TABLE 1

| Symbol | Name | Definition |
|---|---|---|
| M | Modified | Dirty data; no other cache in the system has a copy |
| $^gO$ | Owned, Globally Shared | Dirty data; some other cache in the system (including a remote cache) may have a copy |
| $^lO$ | Owned, Locally Shared | Dirty data; some other cache in the system (but no remote cache) may have a copy |
| E | Exclusive | Clean data; no other cache in the system has a copy |
| $^gS$ | Shared, Globally Shared | Clean data; some other cache in the system (including a remote cache) may have a copy |
| $^lS$ | Shared, Locally Shared | Clean data; some other cache in the system (but no remote cache) may have a copy |
| I | Invalid | This cache does not have a valid copy of the data |

Further, as shown in decision 306, it is determined whether a valid copy of the data exists. In one embodiment, it may be determined whether the state of the requested data indicates that the data is invalid. For example, the state in the response received from the cache may indicate that the requested data in the cache is invalid (e.g., by returning a cache state of "I" from Table 1, etc.). If it is determined in decision 306 that a valid copy of the data does not exist, then in operation 308 an additional request for the data is sent. In one embodiment, the additional request may be sent to another cache of the first node. For example, if the first request was sent to one of private caches 208A-N or shared cache 210 of node 202A, the additional request may be sent to another cache in the node 202A. In another embodiment, the additional request may be sent to another node. For example, if the first request was sent to one of private caches 208A-N or shared cache 210 of node 202A, the additional request may be sent to one or more caches of nodes 202B-D.

However, if it is determined in decision 306 that a valid copy of the data does exist, then in decision 310 it is determined whether the first request is a read request or a write request. In one embodiment, it may be determined that the first request for data is a read request if the first request is identified as a request to read data from a particular address, a read to share request, etc. Additionally, in another embodiment, it may be determined that the first request for data is a write request if the first request is identified as a request to write data to a particular address, a read exclusive request, a read to own request, etc.

Additionally, if it is determined in decision 310 that the first request is a read request, then in operation 312 the read request is completed locally. For example, if it is determined that a read request has been sent to one of private caches 208A-N or shared cache 210 of node 202A, then the data may be read from the respective cache and no additional requests for the data may be sent.

However, if it is determined in decision 310 that the first request is a write request, then in decision 314 it is determined whether the requested data in the cache is locally or globally shared. In one embodiment, it may be determined whether the state of the requested data indicates that the data is located in a cache of a node other than the first node. For example, the state in the response received from the cache may indicate that all copies of the requested data are located in caches of the first node (e.g., by returning a cache state of "M," "$^1$O," "E," or "$^1$S" from Table 1, etc.). In another example, the state in the response received from the cache may indicate that one or more copies of the requested data are located in caches other than the first node (e.g., by returning a cache state of "$^g$O" or "$^g$S" from Table 1, etc.).

If it is determined in decision 314 that the requested data in the cache is locally shared, then in operation 316 the write request is completed locally. For example, if it is determined that a write request has been sent to private cache 208A of node 202A, and that additional copies of the data in private cache 208A may exist, but only in caches of node 202A, one or more additional requests for the data may be sent to one or more of private caches 208B-N and/or shared cache 210 of node 202A in order to invalidate the requested data in those caches, but no additional requests for data may be sent to caches of nodes 202B-D.

Additionally, if it is determined in decision 314 that the requested data in the cache is globally shared, then in operation 318 the write request is completed globally. In one embodiment, if it is determined that a write request has been sent to private cache 208A of node 202A, and that additional copies of the data in private cache 208A may exist in caches of nodes other than node 202A, one or more additional requests for the data may be sent to one or more of private caches 208B-N and/or shared cache 210 of node 202A as well as caches of nodes 202B-D. For example, an additional request may be sent by node 202A to a node in system 200 that is determined to be the home node for a particular memory address associated with the requested data. In another embodiment, additional requests may be sent to caches of nodes 202B-D in order to invalidate the requested data in those caches.

Further, in one embodiment, the determination as to whether the first request is to be completed locally or globally (as shown above in decisions 310 and 314 as well as operations 312, 316, and 318) may be alternately illustrated in a decision table as shown in Table 2. Of course, it should be noted that the current embodiment may not be limited to the decision table shown in Table 2, and that any other decision table that incorporates a cache state protocol which includes an indication of whether data is globally or locally shared may be used. In addition, in one embodiment, the decision table as shown in Table 2 may exist in the form of a decision data structure such as a table, a decision tree, a linked list, etc. Additionally, the decision table as shown in Table 2 may exist as a series of processor instructions.

TABLE 2

| Symbol | If Valid Read: | If Valid Write: |
|---|---|---|
| M | Complete locally | Complete locally |
| $^g$O | Complete locally | Complete globally |
| $^l$O | Complete locally | Complete locally |
| E | Complete locally | Complete locally |
| $^g$S | Complete locally | Complete globally |
| $^l$S | Complete locally | Complete locally |
| I | N/A | N/A |

In this way, additional requests for data to nodes other than the first node may be avoided if the first request can be completed locally, thereby minimizing the latency and bandwidth usage resulting from data requests and transfers to caches of nodes other than the first node.

Additionally, in one embodiment, the present embodiments may also be used to further optimize other systems, methods, and computer program products that conditionally send requests for data. See, for example, U.S. patent application Ser. No. 12/571,230, filed Sep. 30, 2009, which is hereby incorporated by reference in its entirety, and which describes an example of conditionally sending requests for data to a home node.

Figure 4:
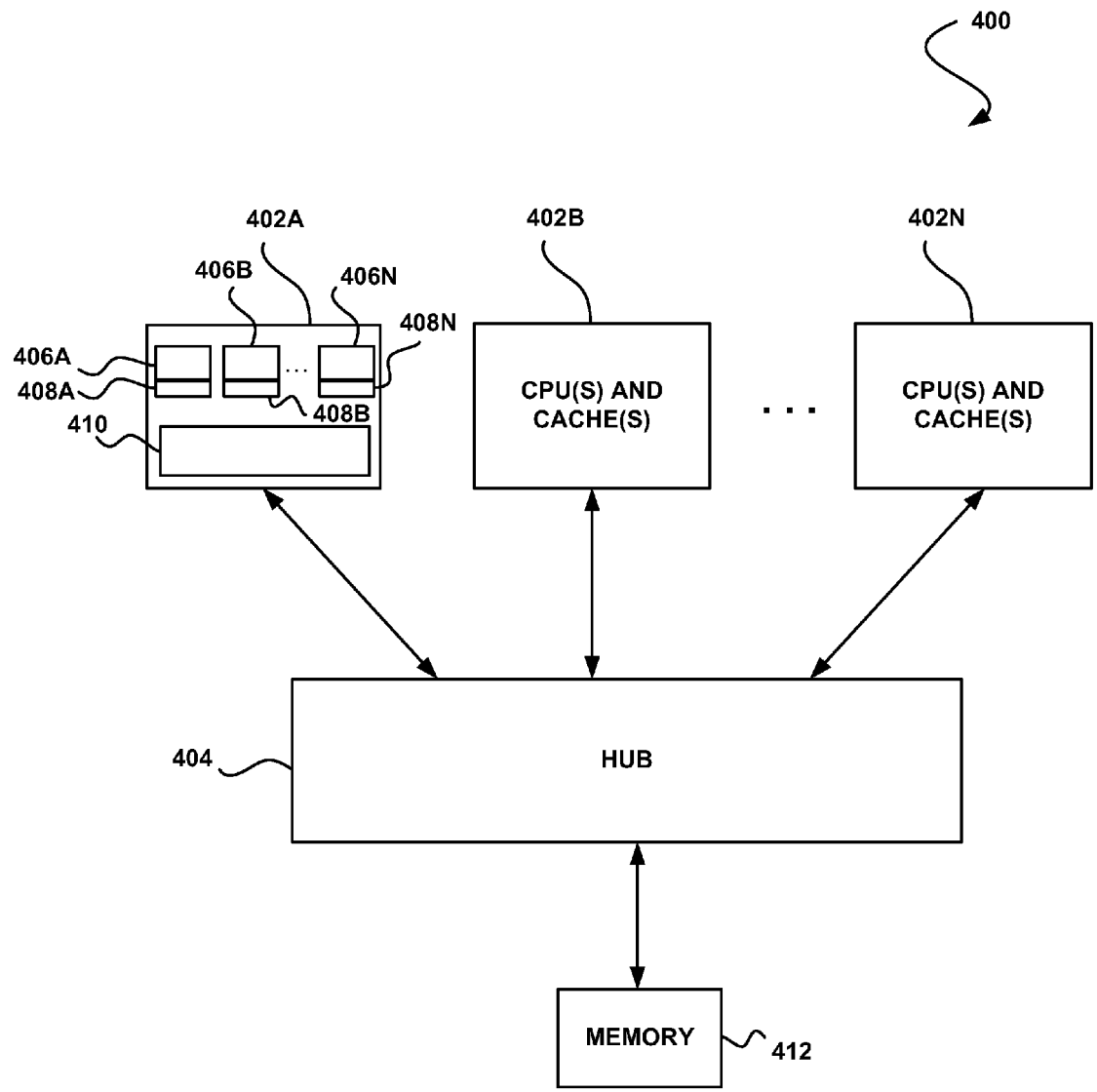
FIG. 4 shows an exemplary symmetric multiprocessor (SMP) system in which the various previous embodiments may be implemented, in accordance with another embodiment.

FIG. 4 shows an exemplary symmetric multiprocessor (SMP) system 400 in which the various previous embodiments may be implemented, in accordance with another embodiment. As an option, the system 400 may be implemented to carry out one or more of method 100 of FIG. 1, method 300 of FIG. 3, etc. Of course, however, the system 400 may be implemented in any desired environment. It should also be noted that the aforementioned definitions may apply during the present description.

As shown, the system 400 includes a plurality of nodes 402A-N, each including processors and associated caches. For example, node 402A includes processors 406A-N, each containing a private cache 408A-N. Additionally, node 402A includes a shared cache 510. Additionally, each of the nodes 402A-N are in communication with each other as well as an associated memory 412 via a hub 404.

Figure 5:
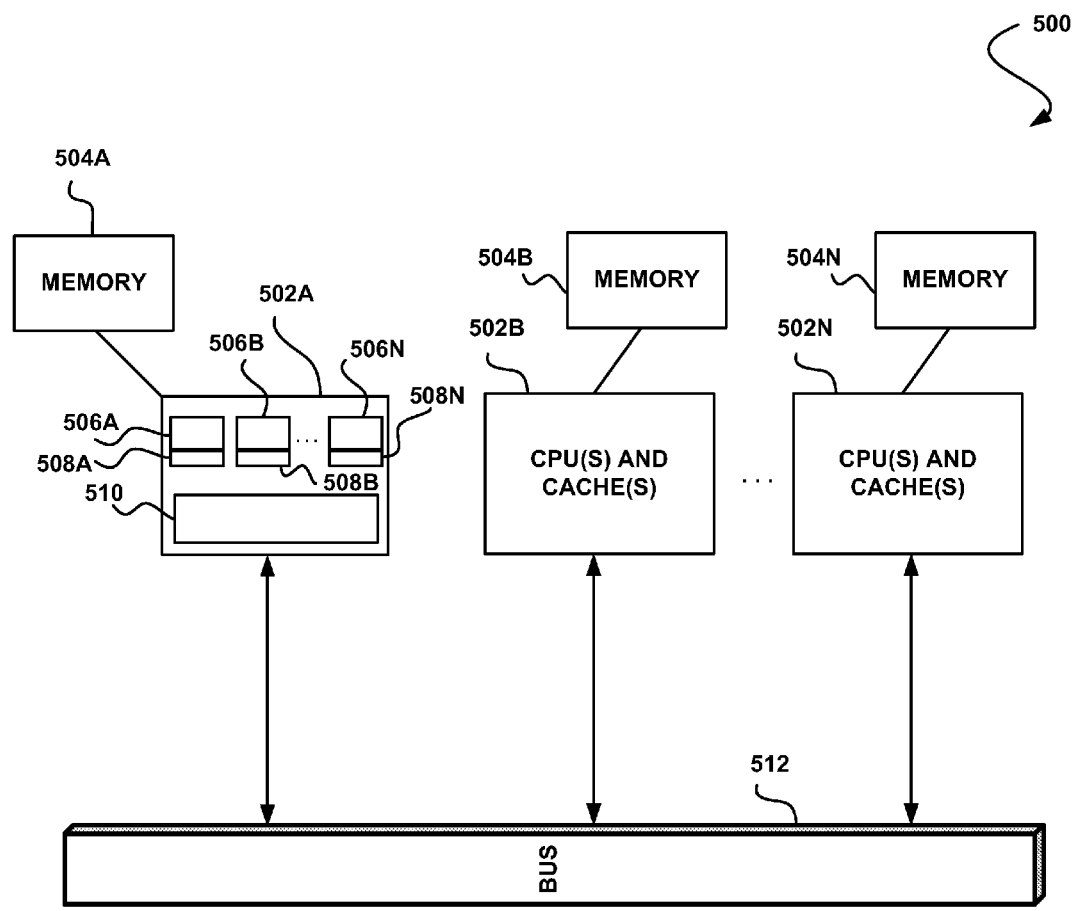
FIG. 5 shows an exemplary non-uniform memory architecture (NUMA) system in which the various previous embodiments may be implemented, in accordance with yet another embodiment.

FIG. 5 shows an exemplary non-uniform memory architecture (NUMA) system 500 in which the various previous embodiments may be implemented, in accordance with yet another embodiment. As an option, the system 500 may be implemented to carry out one or more of method 100 of FIG. 1, method 300 of FIG. 3, etc. Of course, however, the system 500 may be implemented in any desired environment. It should also be noted that the aforementioned definitions may apply during the present description.

As shown, the system 500 includes a plurality of nodes 502A-N, each including processors and associated caches. For example, node 502A includes processors 506A-N, each containing a private cache 508A-N. Additionally, node 502A includes a shared cache 510. Additionally, each of the nodes 502A-N also has an associated memory 504A-N. Further, each of the nodes 502A-N is in communication with the other nodes 502A-N via a bus 512.

Figure 6:
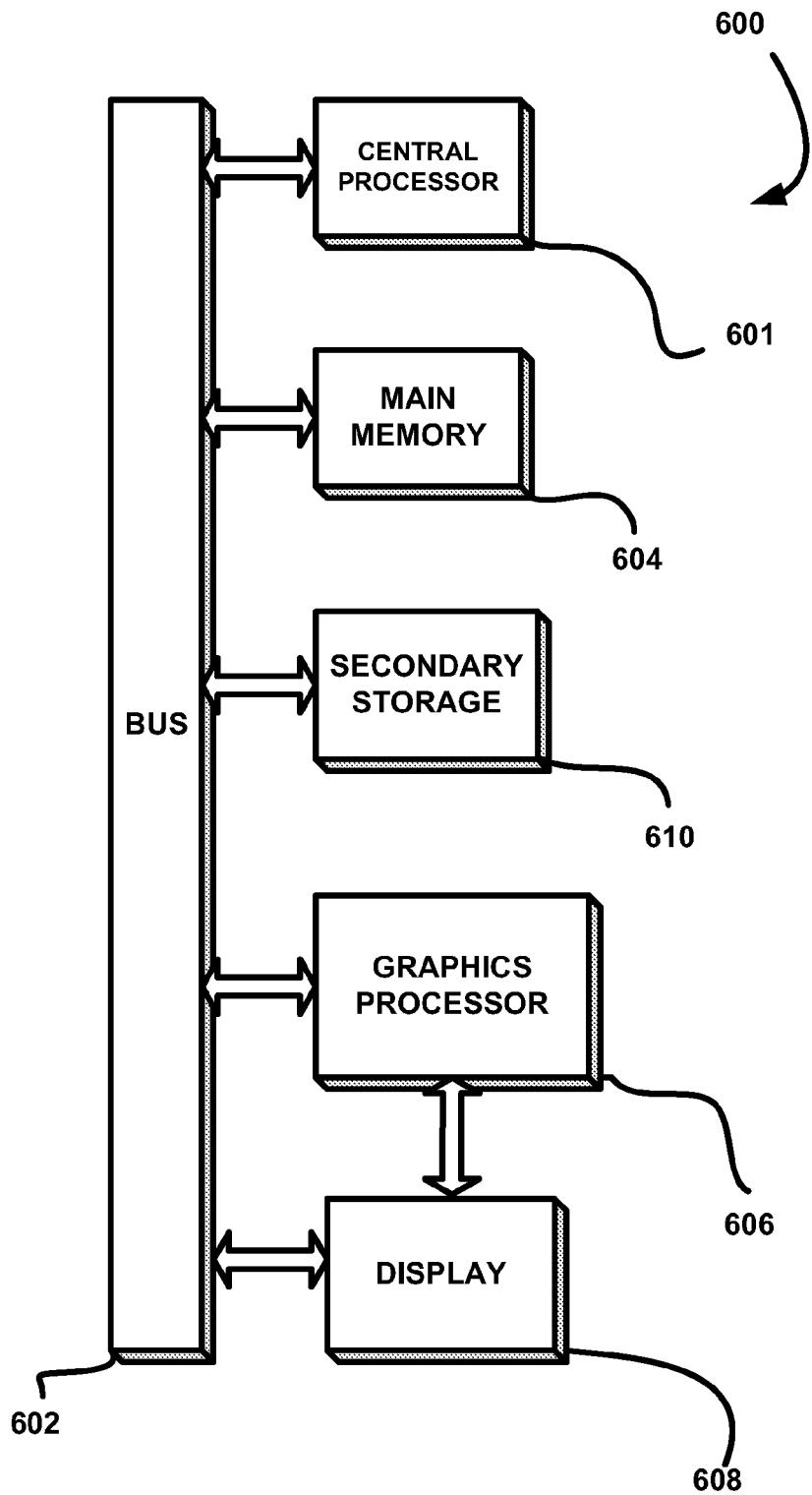
FIG. 6 illustrates an exemplary system in which the various architecture and/or functionality of the various previous embodiments may be implemented.

FIG. 6 illustrates an exemplary system 600 in which the various architecture and/or functionality of the various previous embodiments may be implemented. As shown, a system 600 is provided including at least one host processor 601 which is connected to a communication bus 602. The system 600 also includes a main memory 604. Control logic (software) and data are stored in the main memory 604 which may take the form of random access memory (RAM).

The system 600 also includes a graphics processor 606 and a display 608, i.e. a computer monitor. In one embodiment, the graphics processor 606 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 600 may also include a secondary storage 610. The secondary storage 610 includes, for example, a hard disk drive and/or a removable storage drive, representing a floppy disk drive, a magnetic tape drive, a compact disk drive, etc.

The removable storage drive reads from and/or writes to a removable storage unit in a well known manner.

Computer programs, or computer control logic algorithms, may be stored in the main memory 604 and/or the secondary storage 610. Such computer programs, when executed, enable the system 600 to perform various functions. Memory 604, storage 610 and/or any other storage are possible examples of computer-readable media.

In one embodiment, the architecture and/or functionality of the various previous figures may be implemented in the context of the host processor 601, graphics processor 606, an integrated circuit (not shown) that is capable of at least a portion of the capabilities of both the host processor 601 and the graphics processor 606, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 600 may take the form of a desktop computer, lap-top computer, and/or any other type of logic. Still yet, the system 600 may take the form of various other devices including, but not limited to, a personal digital assistant (PDA) device, a mobile phone device, a television, etc.

Further, while not shown, the system 600 may be coupled to a network [e.g. a telecommunications network, local area network (LAN), wireless network, wide area network (WAN) such as the Internet, peer-to-peer network, cable network, etc.] for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method of sending a data request in a system comprising a plurality of nodes, comprising:
    sending a first request for data to a cache of a first node;
    determining whether the first request can be satisfied within the first node by determining a type of the first request and determining a state of the data in the cache, wherein the state of the data in the cache includes information concerning whether the data is shared locally or globally; and
    conditionally sending a second request for the data to a second node, based on the determination.

2. The method of claim 1, wherein the second node is a home node.

3. The method of claim 1, wherein the determining the type of the first request includes determining whether the first request is a read request, a write request, or a snoop request.

4. The method of claim 1, wherein the determining whether the first request can be satisfied within the first node further includes determining whether the cache contains a valid copy of the data.

5. The method of claim 1, wherein the determining whether the first request can be satisfied within the first node further includes determining whether the data is locally shared or globally shared.

6. The method of claim 5, wherein the determining whether the data is locally shared or globally shared is performed using the state of the data in the cache.

7. The method of claim 1, wherein the cache includes the state of the data in the cache.

8. The method of claim 1, wherein the state of the data in the cache indicates whether another valid copy of the data exists at a node other than the first node.

9. The method of claim 1, wherein the first request cannot be satisfied within the first node if the first request is a write request, the cache contains a valid copy of the data, and another valid copy of the data exists at another node.

10. The method of claim 1, wherein the first request can be satisfied within the first node if the first request is a write request, the cache contains a valid copy of the data, and all valid copies of the data exist only within the first node.

11. The method of claim 1, wherein the first request can be satisfied within the first node if the first request is a read request and the cache contains a valid copy of the data.

12. The method of claim 1, wherein the second request for the data is sent to the second node if it is determined that the first request cannot be satisfied within the first node.

13. The method of claim 1, wherein the determining whether the first request can be satisfied within the first node includes determining the state of the data in the cache.

14. The method of claim 7, wherein the state of the data is included as a tag which exists in the cache at a cache-line.

15. The method of claim 7, wherein the state of the data includes one or more bits which are added to the data at a cache-line.

16. The method of claim 7, wherein the state of the data is encoded with the data in the cache.

17. The method of claim 7, wherein the state of the data is included in the cache as a modification of an existing cache state protocol.

18. The method of claim 1, wherein the first node is part of a multi-node system.

19. The method of claim 1, wherein the first node includes a chip-multi-processor (CMP).

20. A computer program product embodied on a non-transitory computer readable medium containing computer code that, when executed by one or more processors, causes the one or more processors to perform actions comprising:
    sending a first request for data to a cache of a first node;
    determining whether the first request can be satisfied within the first node by determining a type of the first request and determining a state of the data in the cache, wherein the state of the data in the cache includes information concerning whether the data is shared locally or globally; and
    conditionally sending a second request for the data to a second node, based on the determination.

21. An apparatus, comprising: a first node including at least one processor configured to:
    send a first request for data to a cache of the first node,
    determine whether the first request can be satisfied within the first node by determining a type of the first request and determining a state of the data in the cache, wherein the state of the data in the cache includes information concerning whether the data is shared locally or globally, and
    conditionally send a second request for the data to a second node, based on the determination.

* * * * *